GALLUP & HEWITT.
Churn.
No. 47,292.
Patented April 18, 1865.
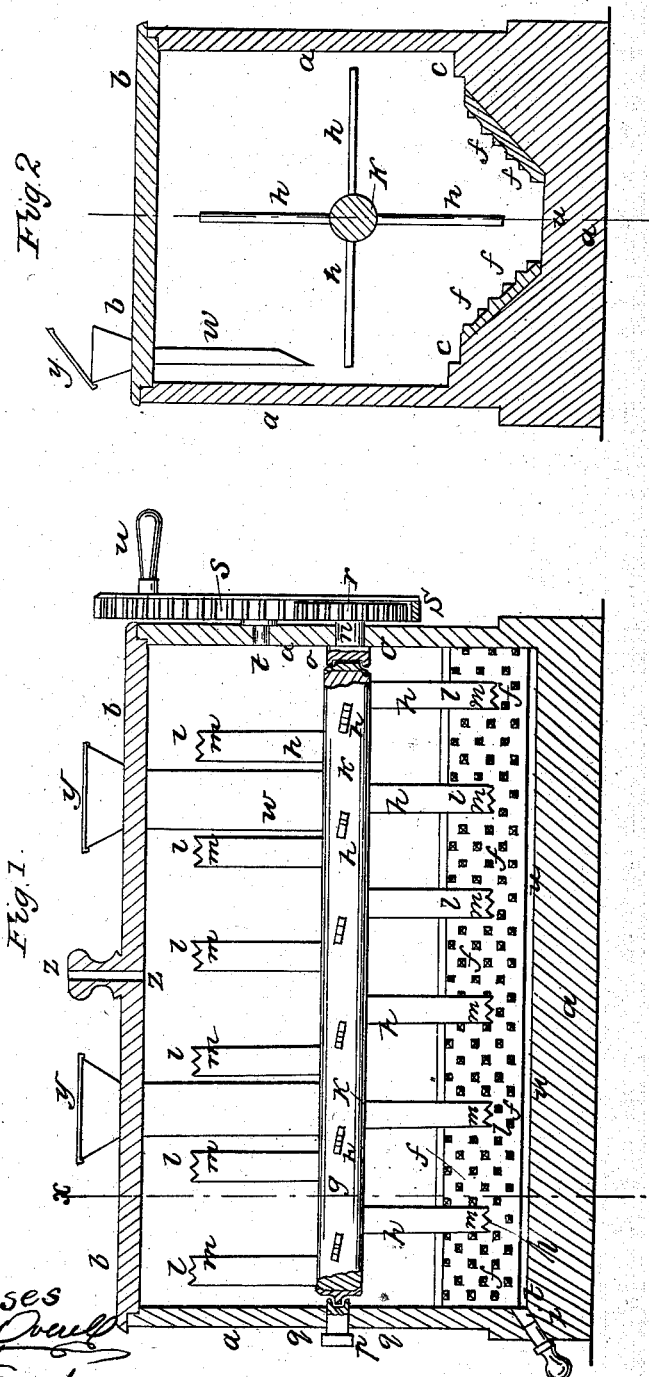

UNITED STATES PATENT OFFICE.

A. O. GALLUP, OF SALEM, AND E. A. HEWITT, OF NEW LONDON, CONN.

IMPROVED CHURN.

Specification forming part of Letters Patent No. 47,292, dated April 18, 1865.

*To all whom it may concern:*

Be it known that we, A. O. GALLUP, of Salem, New London county, Connecticut, and E. A. HEWITT, of New London, New London county, Connecticut, have invented a new and useful Improvement in Churns; and we do hereby declare that the following is a full, clear, and exact description thereof, which will enable those skilled in the art to make and use the same, reference being had to the accompanying drawings, forming part of this specification.

Many butter-churning machines have been heretofore invented and patented consisting of various arrangements of devices, the principal object in view being the expeditious churning of butter from the milk or cream; but where time has been gained it has usually been at the expense of a complicated arrangement of mechanism requiring much outlay, much physical labor to operate, and besides so inconvenient and cumbersome as in fact to hardly be an improvement over the ordinary and slow processes of churning. The great desiderata to be obtained in churning-machines are therefore simplicity of construction and operation, requiring but little labor to operate the same, in connection with expeditiousness and quickness in the extraction of the butter from the cream.

To produce such a machine is the object of the present invention, and is accomplished thereby, our improvements consisting, first, in a peculiar formation of the sides or bottom or both of the churn, with a series of sharp, pyramidal, polygonal, or any other suitable shaped projecting points or spurs of any desired number and size, and at any suitable distances apart, against which the cream, as it is agitated in the churn by any suitable dasher, is thrown, and thereby its globules of butter broken; second, in the use of a peculiar shaped dasher, consisting of a series of beaters arranged suitably on a shaft, either spirally or otherwise, and having their outer ends formed with one or more sharp points or spurs, for also cutting and breaking the butter-globules, said dasher-shaft being so arranged as to be easily susceptible of removal at pleasure for cleansing the same and the churn, and also placed in proper position to act in conjunction with the said pointed bottom or sides of the churn; third, in a peculiar way of ventilating the churn, and thus preserve the desired temperature therein when in use, as will be hereinafter described.

Having thus generally stated the objects and arrangement of the present improvement in churns, we will now proceed to describe the same in detail, reference being had to the accompanying plate of drawings, of which—

Figure 1 is a central longitudinal vertical section; and Fig. 2, a transverse vertical section in plane of line $x$ $x$, Fig. 1.

$a$ $a$ in the drawings represent a box or receptacle, made of any desired shape and size, in which the milk or cream to be churned is placed through any suitable opening or by removing its top or cover $b$ $b$. These inclined sides $c c$ and $d d$ in the bottom of this box $a$ are formed with a series of sharp pointed, pyramidal, polygonal, &c., spurs, projections, or studs, $f f f$, of any desired number and size, and any suitable distances apart. $g$ $g$, the dasher, consisting of a series of projecting arms, $h$ $h$, arranged spirally or in any proper manner around and attached to a horizontal shaft, K, placed longitudinally in box $a$ and turning on suitable bearings therein. These beaters have their outer ends, $b$, formed with sharp points or spurs $m$ $m$ and are of sufficient length that when the dasher-shaft is revolved they will nearly interlock with the projecting spurs $f f$ on the sides of the box $a$, before referred to.

The shaft K is hung at one end to a short shaft, $n$, passing through box end $o$ and turning therein, and at the other by a screw-rod, $p$, of the opposite end of box $q$, which can be screwed in or out of same, if desired, to remove the dasher to cleanse it.

On the outer end of shaft $n$ is a small gear-wheel, $r$, interlocking with the inner periphery of a larger gear, $s$, attached to a shaft, $t$, turning in bearings of box end $o$, and having a crank-handle, $u$. By turning the crank $u$ the gear $s$ is revolved, and through its interlocking gear $r$ the dasher in the churn also.

Placing the cream in the churn and then turning the carnk-handle $u$, whereby the dasher is revolved, as described, the cream is necessarily agitated, and by the quick revolution of the dasher, on the arms of which it collects, is caused to be centrifugally impelled and thrown against the pointed sides of the churn with such force as in a short time to thoroughly break, cut, and separate the globules of butter contained in the same. Also, its pointed ends, acting in connection with the sides of the churn, as the arms pass by the same, still further serve to cut the globules up, and thereby quickly churn the butter, as is evident without further description.

By the present improved churn we are enabled to obtain and extract more butter from cream than has heretofore been possible in the churns used previous to our invention, owing to the peculiar and effective manner in which the globules are broken.

In lieu of forming the sides only of the churn, as described, and represented in the drawings, the bottom $u$ also may be formed with sharp points of any suitable shape and size, but we have found by practice that it is only necessary and is as expeditious to simply use the pointed sides, although only a pointed bottom could be used with a great deal of advantage.

To preserve the temperature in the churn at the desired and best degree during the operation of churning, air-spouts $w\ w$ are used, extending from the top of churn $a$, where they communicate with the external air, a sufficient distance into the churn and over, or nearly so, the inclined sides in proper position that as the dasher revolves the arms same shall pass by the inner openings of spouts, and thus, as it were, create a vacuum at the same, by which a current of air is established through the spouts $m\ m$. For the regulation of the current, covers $y\ y$ are attached to the outer ends of spouts $w\ w$, which can be set in any desired position, or the spouts may be entirely closed, as may be desired. The currents of air through these spouts is also directly upon the inclined sides where they come in contact with the globules at the most advantageous time.

$z$ are apertures in top through which the vapor from the churn pass off.

From the above description it is evident that by our improvements we have produced a simply constructed machine, effective and expeditious in operation, and requiring but little expenditure of force to churn the butter from the milk.

$i\ i$ is an aperture in end of churn, through which the butter-milk passes off.

We claim as new and desire to secure by Letters Patent—

1. Forming the sides or bottom of the churn or both with a series of sharp-pointed spurs or projections, arranged substantially as herein described, and for the purpose specified.

2. The use of the pointed dashers or beaters, arranged as described, and for the purpose specified.

3. The combination of the dashers $h\ h$ with projections $f\ f$, arranged and operating substantially as described.

A. O. GALLUP.
      E. A. HEWITT.

Witnesses:
 M. M. LIVINGSTON,
 C. L. TOPLIFF.